Sept. 20, 1927.  B. B. DRISCOLL  1,643,006
MOTOR CYCLE SUPPORT
Filed Aug. 31, 1926
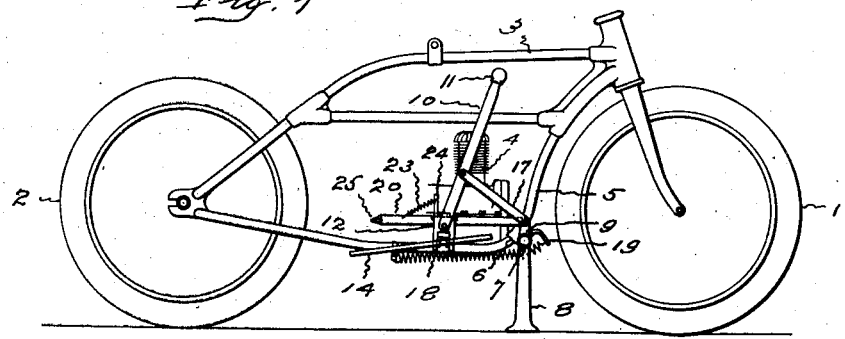
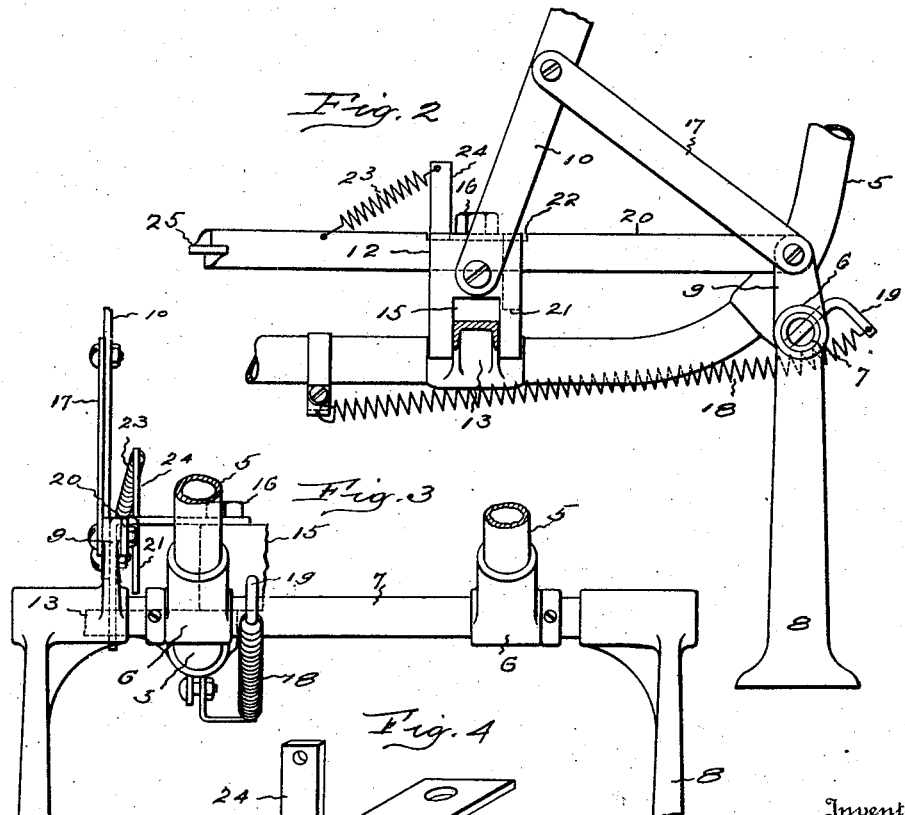
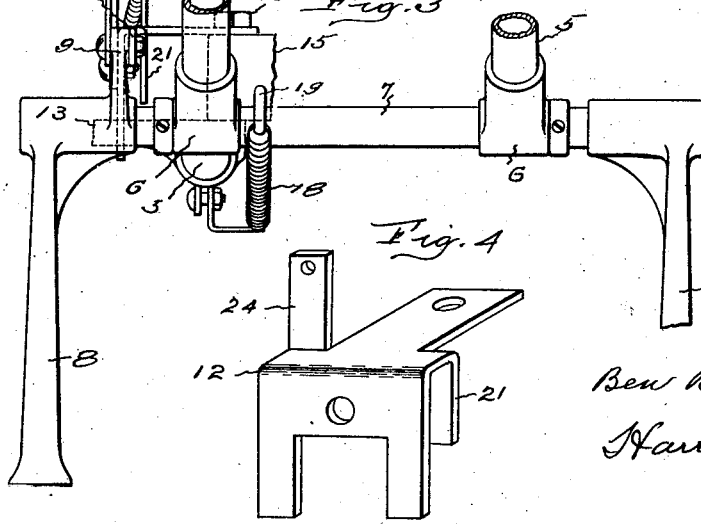

Patented Sept. 20, 1927.

1,643,006

UNITED STATES PATENT OFFICE.

BEN B. DRISCOLL, OF HARTFORD, CONNECTICUT, ASSIGNOR OF ONE-HALF TO SYLVESTER B. DISCENZA, OF HARTFORD, CONNECTICUT.

MOTOR-CYCLE SUPPORT.

Application filed August 31, 1926. Serial No. 132,837.

This invention relates to those attachments which are applied to motorcycles for the purpose of supporting them in an upright position when standing at rest.

The object of the invention is to provide a simple and cheap support for such purpose which is readily attached to the frames of the motorcycles in common use and which can be easily and quickly manipulated by the hand of the operator sitting in the saddle so that legs will swing down to the ground and with the rear wheel of the machine, form a three-point long and wide rigid support which will firmly hold the machine upright not only on smooth but on uneven and inclined rough surfaces, such for instance as a crowned street, rutted road or the soft shoulders of highways, which legs are automatically clamped in supporting position but can be released by the foot of the operator in the saddle and allowed to automatically swing up beneath the foot-board to a normal running position as the machine is started, whereby the operator can stand the machine or start up and run off without leaving the saddle, or manipulating the machine to set or release the support, which facilitates quick action on the part of the rider.

This object is attained by pivotally mounting a bar, from which project the supporting legs, on the front part of the frame just back of and below the center of the front wheel of the machine, and connecting a handle lever, that is pivoted to the frame and extends upward to within reach of the driver in the saddle, to this bar in such manner that pulling the handle backward swings the legs forward and downward to the ground some distance each side of the longitudinal axis of the machine and in front of the rider. A latch is connected to and is moved by the bar in such manner that when the legs are on the ground the latch will engage a catch and will hold the parts set firmly in position. When the legs are turned to standing position a spring connected between the frame and the bar is tensioned so that when the latch is released from the catch and the machine is started forward by the driver in the saddle, the legs will swing up beneath the foot-boards and remain in running position.

In the accompanying drawings Fig. 1 illustrates a device that embodies the invention attached to the frame of a motorcycle in position to support the machine. Fig. 2 shows, on larger scale, a side view of one of the attachments. Fig. 3 is a front view of the attachment. Fig. 4 is a perspective view of an angle plate that may be used to connect the operating lever with the frame of the machine.

In the views 1 indicates the front wheel, 2 the rear wheel, 3 the frame supported by the wheels, and 4 the engine carried by the frame, of a motorcycle in general use. On the front depending tubes 5 of the frames of some of the well known types of motorcycles there are tubular bearing brackets 6 designed to receive and hold the connections of side cars. To machines which are not so provided by the manufacturer, such brackets may be fastened by anyone desiring to apply attachments embodying this invention.

The attachment illustrated has a tubular cross bar 7 that is rotatably mounted in the bearing brackets 6. Fastened to the ends of this bar are legs 8 of such length that when they are turned down they will rest upon the ground and form a wide support for the machine. Extending upward from the bar or from the upper end of one of the legs is a rocker arm 9.

The operating lever 10 with handle 11 at its upper end within reach of the rider in the saddle of the machine, has its lower end pivotally connected to the outer face of an angle plate 12. Fastened to the lower tube of the machine frames in general use are brackets 13, the outer ends of which support the foot boards 14 while the inner ends support the engine lugs 15. The lower end of the depending limb of the angle plate 12 is forked and is designed to embrace one of the brackets 13, while the inwardly extending limb of the angle plate 12 is perforated and designed to be fastened to the engine supporting lug 15 by one of the bolts 16 employed to fasten the engine to the frame.

A link 17 connects the operating lever 10 with the rocker arm 9 in such manner that when the handle end of the lever is pulled backward the supporting legs are turned down to the ground and when the handle is pushed forward the supporting legs will be turned up under the foot board. A spring 18 is connected between the machine frame and a finger 19 that projects from the cross bar 7 for the purpose of retaining the legs up beneath the foot board in running position.

A latch bar 20 is pivoted to the rocker arm 9 so as to extend rearwardly past the angle plate 12 between the front limb of the plate and the lug 21 that is bent downward from the transverse limb of the plate. The upper edge of this latch has a notch 22 located to engage the transverse limb of the angle plate when the supporting legs are down and retain them in this position. A spring 23 is connected between the latch and a lug 24 bent from the plate, to draw the latch up and retain the latch engaged with the plate. The free end of the latch is bent outward to form a pedal 25 which may be engaged by the foot of the rider so as to press down the latch and release the notch from the plate. When the latch is released and the legs are started from the ground by pushing the lever forward, the spring 18 swings the legs backward and upward into running position beneath the foot board.

This device may be readily attached to the motorcycles in present use without changing any parts of the machines as produced and put upon the market by the manufacturers. The elements of the attachment are cheaply made and assembled and so coact that a powerful leverage is obtained through the hand lever by means of which the legs may be caused to assume a firm supporting position or move out of supporting position into running position by the rider without dismounting from the saddle, which permits quick action on the part of the rider in stopping and dismounting or mounting and starting off.

The invention claimed is:—

1. A motorcycle support comprising a bar adapted to be rotatably attached to and extend transversely across the lower part of the front of a motorcycle frame, legs fixed to the outer ends of said bar and rotatable therewith, a rocker arm connected with and adapted to rotate said bar and legs, a handle lever with means adapted to pivotally connect the lever with the frame of a motorcycle, a link connecting said lever and the rocker arm, and a spring connected with said bar and adapted to be fastened to a motorcycle frame.

2. A motorcycle support comprising a bar adapted to be rotatably attached to and extend transversely across the lower part of the front of a motorcycle frame, legs fixed to the outer ends of said bar and rotatable therewith, a rocker arm connected with and adapted to rotate said bar and legs, a handle lever with means adapted to pivotally connect the lever with the frame of a motorcycle, a link connecting said lever and the rocker arm, and a latch connected with said rocker arm and adapted to engage with said means for connecting the lever with the frame.

3. A motorcycle support comprising a bar adapted to be rotatably attached to and extend transversely across the lower part of the front of a motorcycle frame, legs fixed to the outer ends of said bar and rotatable therewith, a rocker arm connected with and adapted to rotate said bar and legs, an angle plate adapted to be attached to a motorcycle frame, a handle lever pivotally connected with said plate, a link connecting said lever and the rocker arm, a latch connected with the rocker arm and adapted to engage with said plate, and a spring connected with said bar and adapted to be fastened to a motorcycle frame.

BEN B. DRISCOLL.